(12) United States Patent
Ventroni et al.

(10) Patent No.: US 6,417,664 B1
(45) Date of Patent: Jul. 9, 2002

(54) MAGNETIC ROTATIONAL POSITION SENSOR HAVING A PERIPHERALLY INTERRUPTED OUTER POLE PIECE

(75) Inventors: David Anthony Ventroni, Alta Loma; Kenneth Charles Mumper, Ontario; Robert H. Luetzow, Lytle Creek, all of CA (US)

(73) Assignee: Wabash Technologies, Inc., Huntington, IN (US)

( * ) Notice: Subject to any disclaimer, the term of this patent is extended or adjusted under 35 U.S.C. 154(b) by 0 days.

(21) Appl. No.: 09/685,839

(22) Filed: Oct. 9, 2000

Related U.S. Application Data

(63) Continuation-in-part of application No. 09/074,946, filed on May 8, 1998, now Pat. No. 6,137,288.

(51) Int. Cl.7 .............................. G01B 7/30; F02D 9/00
(52) U.S. Cl. .............................. 324/207.2; 324/207.22; 324/207.25
(58) Field of Search ................. 324/207.15, 207.16, 324/207.2–207.25, 173, 174; 123/406.52, 617

(56) References Cited

U.S. PATENT DOCUMENTS

| 4,810,965 | A | | 3/1989 | Fujiwara et al. ............ 324/208 |
|---|---|---|---|---|
| 5,270,645 | A | * | 12/1993 | Wheeler et al. ...... 324/207.2 X |
| 5,332,965 | A | | 7/1994 | Wolf et al. ............ 324/207.12 |
| 5,444,369 | A | | 8/1995 | Luetzow ................. 324/207.2 |
| 5,460,035 | A | | 10/1995 | Pfaffenberger ............. 73/118.1 |
| 5,497,081 | A | | 3/1996 | Wolf et al. ............ 324/207.12 |
| 5,504,427 | A | | 4/1996 | Cooper et al. ......... 324/207.17 |
| 5,506,502 | A | | 4/1996 | Maennle ................ 324/207.25 |
| 5,512,820 | A | | 4/1996 | Alfors ................... 324/207.22 |
| 5,521,495 | A | | 5/1996 | Takahashi et al. ..... 324/207.18 |
| 5,544,000 | A | | 8/1996 | Suzuki et al. ............... 361/139 |
| 5,572,120 | A | | 11/1996 | Takaishi et al. ....... 324/207.21 |
| 5,578,962 | A | | 11/1996 | Rastegar ....................... 330/9 |
| 5,600,238 | A | | 2/1997 | Holloway et al. ..... 324/207.21 |
| 5,602,471 | A | | 2/1997 | Muth et al. ............ 324/207.21 |
| 5,611,548 | A | | 3/1997 | Dahlhaus .................... 277/152 |
| 5,621,179 | A | | 4/1997 | Alexander ............. 73/862.331 |
| 5,625,239 | A | | 4/1997 | Persson et al. ........... 310/68 B |
| 5,625,289 | A | | 4/1997 | Daetz et al. ............ 324/207.14 |
| 5,627,465 | A | | 5/1997 | Alfors et al. ............ 324/207.2 |
| 5,698,778 | A | | 12/1997 | Ban et al. ................... 73/118.1 |
| 5,712,561 | A | | 1/1998 | McCurley et al. ....... 324/207.2 |
| 5,861,745 | A | * | 1/1999 | Herden .................... 324/207.2 |
| 6,137,288 | A | * | 10/2000 | Luetzow .................. 324/207.2 |
| 6,310,473 | B1 | * | 10/2001 | Zhao .................... 324/207.2 X |

* cited by examiner

Primary Examiner—Gerard R. Strecker
(74) Attorney, Agent, or Firm—Woodard, Emhardt, Naughton Moriarty & McNett (57) ABSTRACT

A magnetic rotational position sensor for sensing the rotational position of a control shaft about a first axis over a definable range of rotation is disclosed. The magnetic rotational position sensor includes a magnetic circuit formed by a peripherally interrupted outer pole piece defining an air gap and a magnet disposed within the air gap to generate a magnetic field. The magnetic circuit is adjoined to the control shaft to synchronously rotate the magnetic field about a second axis. A magnetic flux sensor is disposed within the magnetic field to sense the rotational position of the control shaft as the control shaft is rotated about the first axis over the definable range of rotation.

20 Claims, 12 Drawing Sheets

MAGNETIC ROTATIONAL POSITION SENSOR HAVING A PERIPHERALLY INTERRUPTED OUTER POLE PIECE

REFERENCE TO RELATED APPLICATIONS

This application is a continuation in part of No. 09/074,946, filed May 8, 1998, now U.S. Pat. No. 6,137,288, which is hereby incorporated by reference.

BACKGROUND OF THE INVENTION

The present invention generally relates to the field of rotational position sensors, and more specifically to a magnetic rotational position sensor for sensing each rotational position of a control shaft about an axis over a definable range of rotation.

Electronic fuel injected engines used in motor vehicles typically embody a microprocessor based control system. Fuel is metered or injector activation time is varied in accordance with various engine parameters including the regulation of air flow into the engine via a rotational position of a throttle diaphragm relative to a closed position of the throttle diaphragm. Typically, a shaft is adjoined to the throttle diaphragm to synchronously rotate the throttle diaphragm as the shaft is rotated between the closed position and a maximal open position of the throttle diaphragm. Rotational position sensors are adjoined to the shaft to sense each rotational position of the shaft, i.e. each degree of rotation of the shaft relative to the closed position, whereby the rotational position of the throttle diaphragm relative to the closed position is sensed.

One of the problems associated with the prior magnetic rotational position sensors is magnetic hysteresis. Magnetic hysteresis causes an offset error signal to be provided whenever a magnetic element of the sensor, e.g. a magnetic pole piece or a magnetic rotor, is advanced from and returned to a reference position of the magnetic element. Annealing the magnetic element can minimize, but never eliminate, magnetic hysteresis. What is therefore needed is a novel and unique magnetic rotational position sensor that does not experience magnetic hysteresis.

SUMMARY OF THE INVENTION

The present invention is a magnetic rotational position sensor that overcomes the aforementioned drawback associated with prior magnetic rotational position sensors. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

In accordance with a first form of the present invention, the magnetic rotational position sensor comprises a ring pole piece defining an air gap area and a magnet disposed within the air gap area to thereby generate a magnetic field therein. The ring pole piece includes a first pole segment, a second pole segment, and a third pole segment. The first pole segment is adjoined to the second pole segment and the third pole segment. The second pole segment and the third pole segment are spaced from each other. The magnet has a first pole surface and a second pole surface. The first pole surface is facing and spaced from the first pole segment. The second pole surface is facing the second pole segment and the third pole segment.

Further forms, objects, features, aspects, benefits, advantages, and embodiments of the present invention shall become apparent from the detailed description and drawings provided herewith.

DESCRIPTION OF THE PREFERRED EMBODIMENT

For the purposes of promoting an understanding of the principles of the present invention, reference will now be made to the preferred embodiment illustrated in the drawings and specific language will be used to describe the same. It will nevertheless be understood that no limitation of the scope of the present invention is thereby intended, such alterations and further modifications in the illustrated embodiments and such further applications of the principles of the present invention as illustrated therein being contemplated as would normally occur to one skilled in the art to which the present invention relates. For purposes of the present invention, the term adjoined is broadly defined as a unitary fabrication, a permanent affixation, a detachable coupling, a continuous engagement, or a contiguous disposal as would occur to one skilled in the art.

The present invention is a novel and unique magnetic rotational position sensor that senses each degree of rotation of a control shaft about an axis over a definable range of rotation without experiencing magnetic hysteresis. For purposes of the present invention, a control shaft is broadly defined as any article of manufacture or any combination of manufactured articles that is adjoined to an object, e.g. a throttle diaphragm, a foot pedal, a piston, etc., to control the linear, angular, and/or rotational movement of the object as the control shaft is rotated about an axis, e.g. a longitudinal axis of the control shaft.

Referring to FIGS. 1A–1D, a first embodiment of a magnetic rotational position sensor 10 in accordance with the present invention is shown. Magnetic rotational position sensor 10 senses each degree of rotation of a control shaft 20 about an axis over a 180 degree range of rotation without experiencing magnetic hysteresis as further described in FIGS. 2A–2C and accompanying text.

Magnetic rotational position sensor 10 comprises a ring pole piece. For purposes of the present invention, a ring pole piece is broadly defined as any magnetizable article of manufacture or any combination of manufactured magnetizable articles that has an open configuration defining an air gap area. For the various embodiments of the present invention, the ring pole piece can vary in geometric size and shape, and can be made from any magnetizable material. Preferably, the ring pole piece is a soft magnetic steel ring pole piece 11 including a pole segment 11a having an arcuate configuration, a pole segment 11b having a rectangular configuration, and a pole segment 11c having a rectangular configuration as shown in FIGS. 1A–1D. Pole segment 11a is adjoined to pole segment 11b and pole segment 11c, and pole segment 11b and pole segment 11c are spaced to thereby define an air gap area 11d. Preferably, pole segment 11a is unitarily fabricated with pole segment 11b and pole segment 11c.

Figures 1A, 1B:
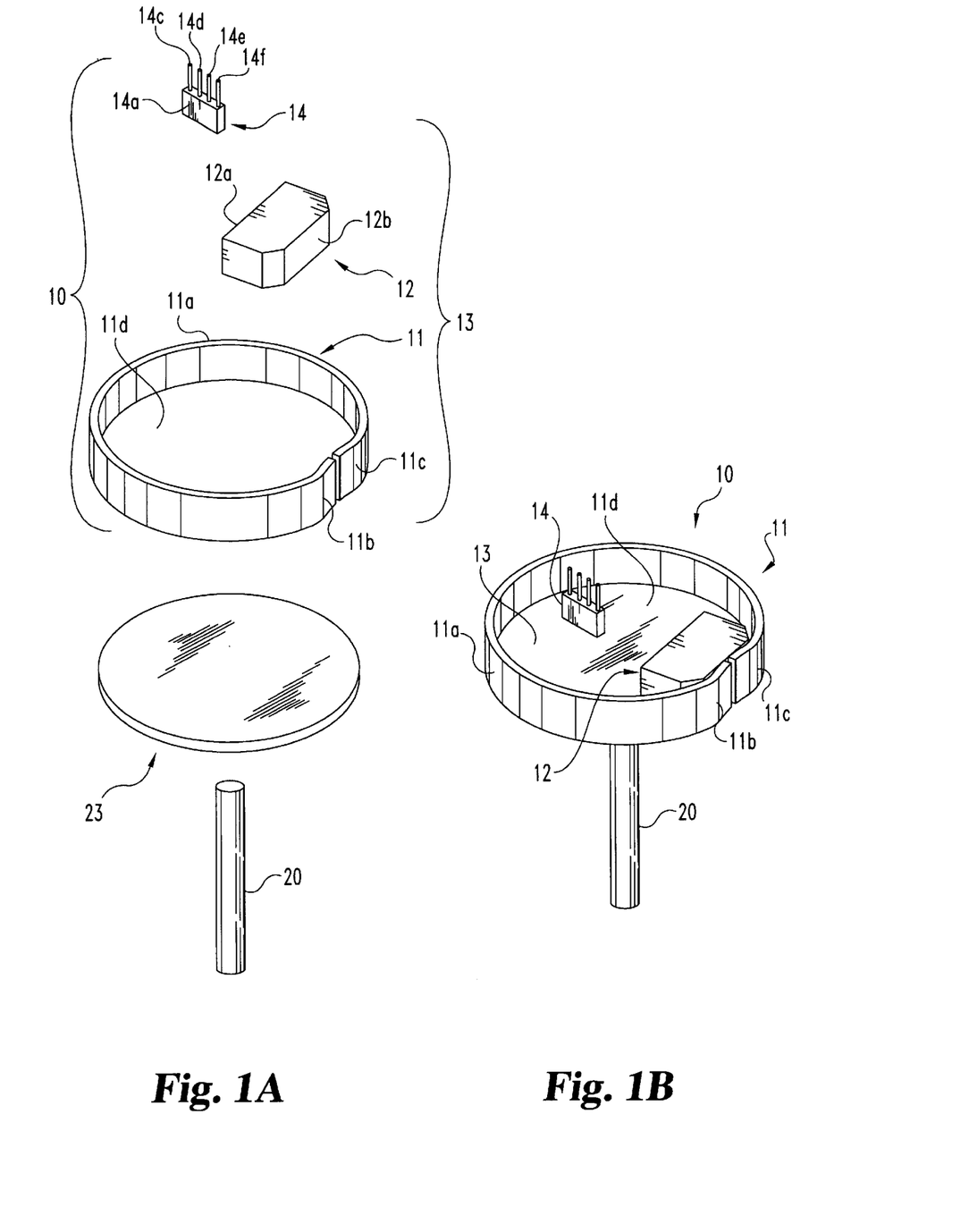
FIG. 1A is a first exploded view of a first embodiment of a magnetic rotational position sensor in accordance with the present invention.
FIG. 1B is a first perspective view of the magnetic rotational position sensor of FIG. 1A as assembled and adjoined to a control shaft.
Figures 1C, 1D:
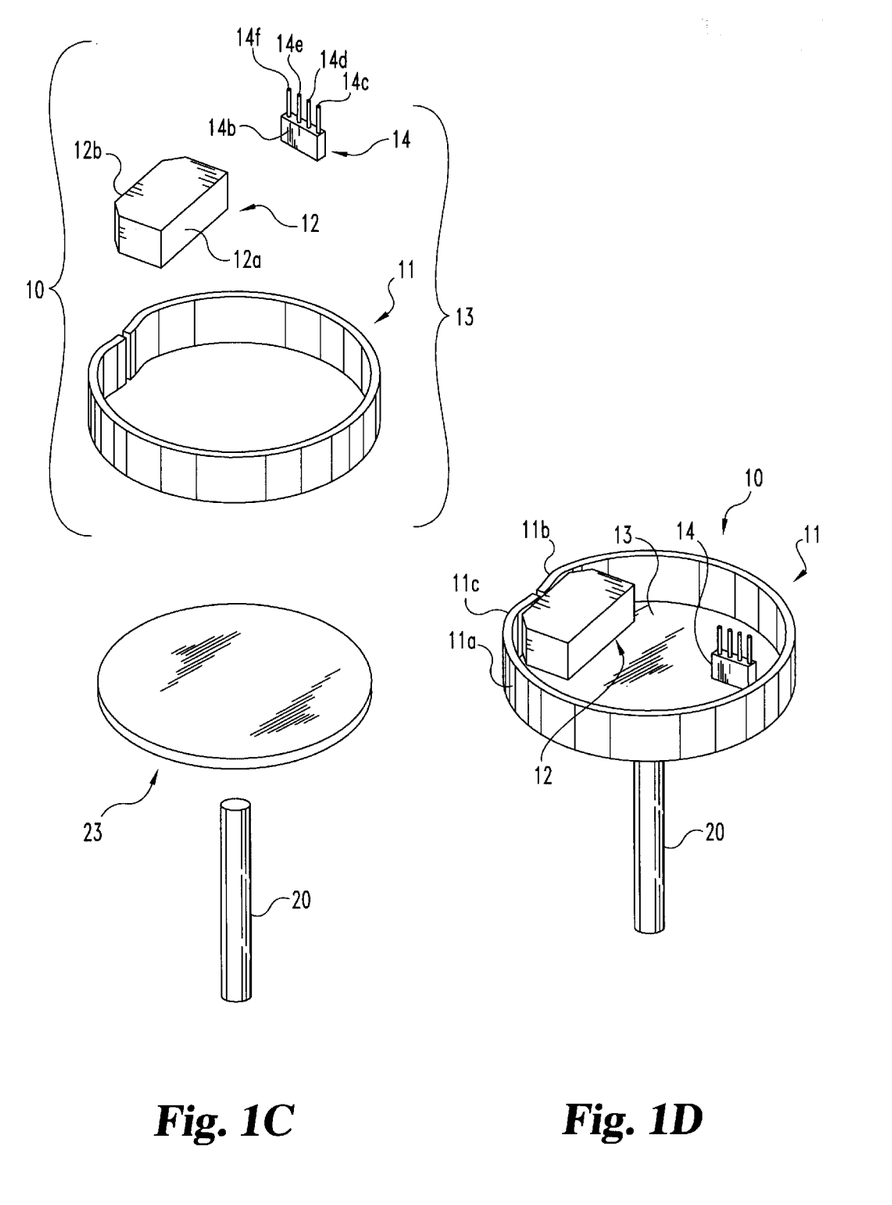
FIG. 1C is a second exploded view of the magnetic rotational position sensor of FIG. 1A.
FIG. 1D is a second perspective view of the magnetic rotational position sensor of FIG. 1A as assembled and adjoined to a control shaft.

Magnetic rotational position sensor 10 further comprises a magnet disposed within air gap area 11d to constitute a magnetic circuit that provides a magnetic field within air gap area 11d and encloses the magnetic field within ring pole piece 11 to prevent magnetic hysteresis. For the various embodiments of the present invention, one of the poles surfaces of the magnet is facing and spaced from pole segment 11a while the other pole surface of the magnet is facing and spaced from pole segment 11b and pole segment 11c, or preferably, one of the poles surfaces of the magnet is facing and spaced from pole segment 11a while the other pole surface of the magnet is facing and adjoined to pole segment 11b and/or pole segment 11c. Additionally, the magnet can vary in geometric size and shape, and can be any type of magnet. Preferably, the magnet is an injection molded rare earth magnet 12 having a substantially semicircular configuration that is void of any magnetic flux density "hot spots" along both pole surfaces. Magnet 12 is disposed within air gap area 11d to constitute a magnetic circuit 13 as shown in FIGS. 1B and 1D. Magnet 12 has a north pole surface 12a facing and spaced from pole segment 11a, and a south pole surface 12b facing and adjoined to pole segment 11b and pole segment 11c to thereby provide an equally balanced magnetic field 15 throughout air gap area 11d and to enclose magnetic field 15 within ring pole piece 11 as further described in FIGS. 2A–2C and accompanying text.

Figure 2A:
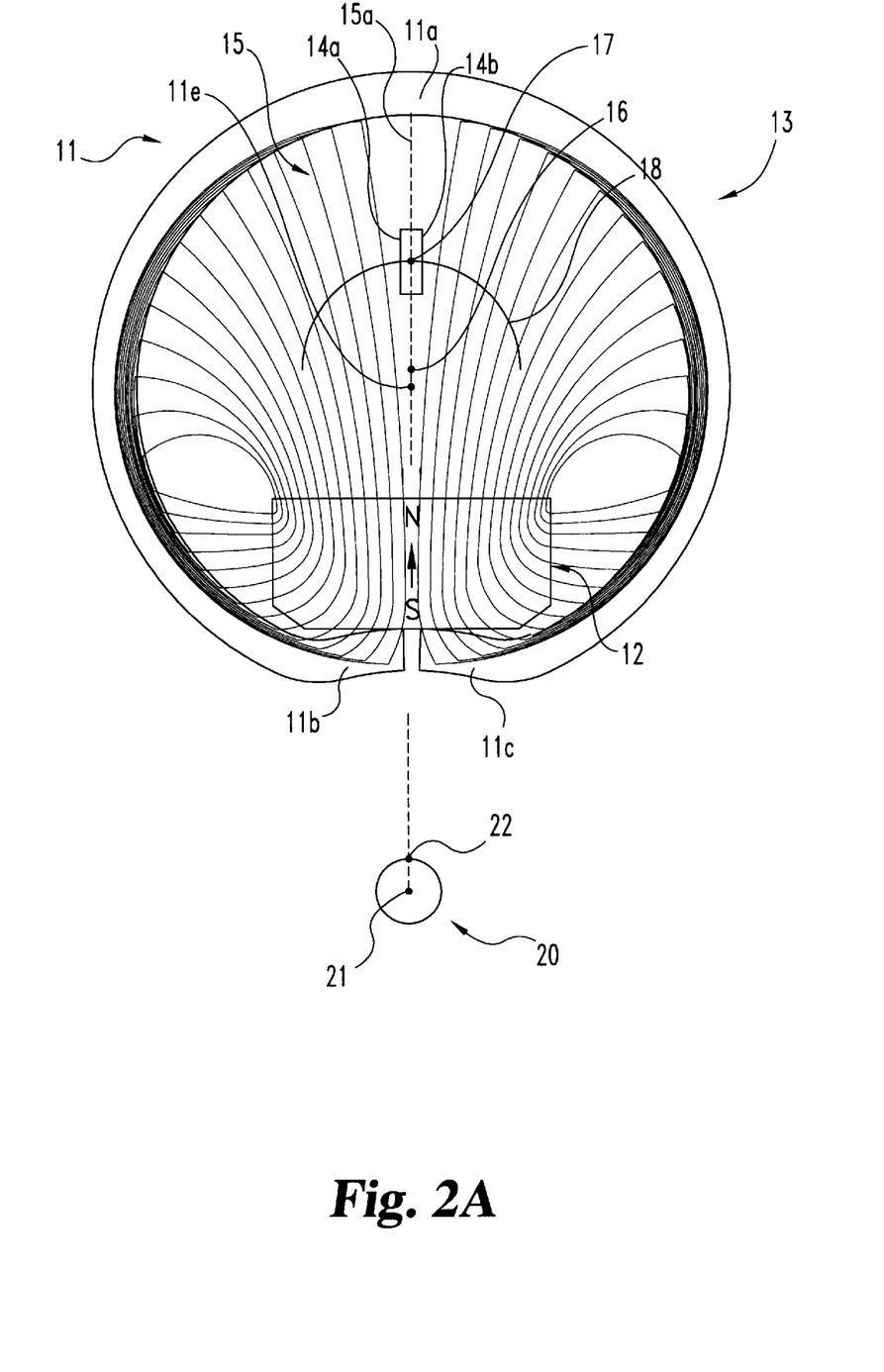
FIG. 2A is a first diagrammatic illustration of a first embodiment of a magnetic circuit of FIGS. 1A–1D.
Figure 2B:
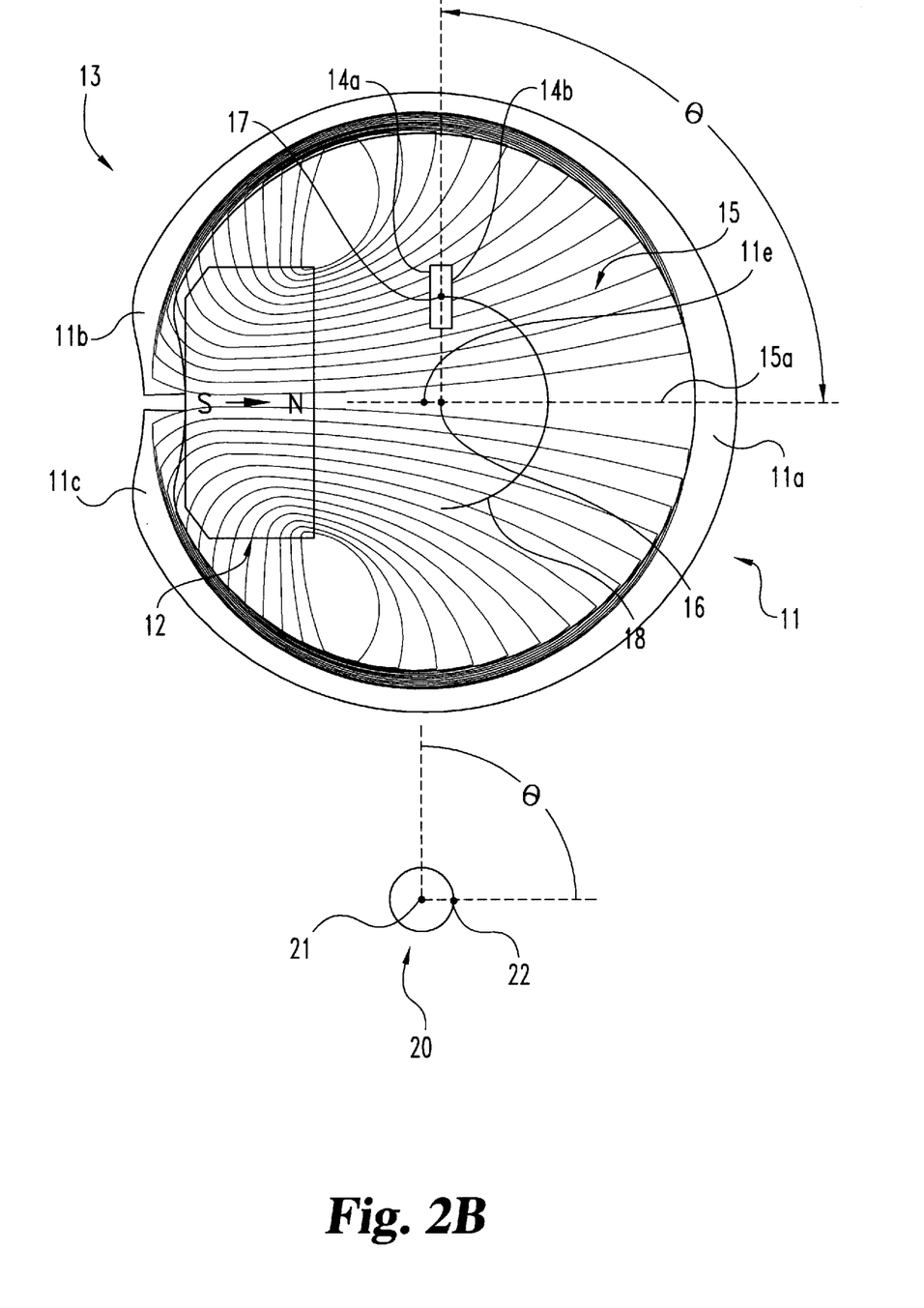
FIG. 2B is a second diagrammatic illustration of the magnetic circuit of FIGS. 1A–1D.
Figure 2C:
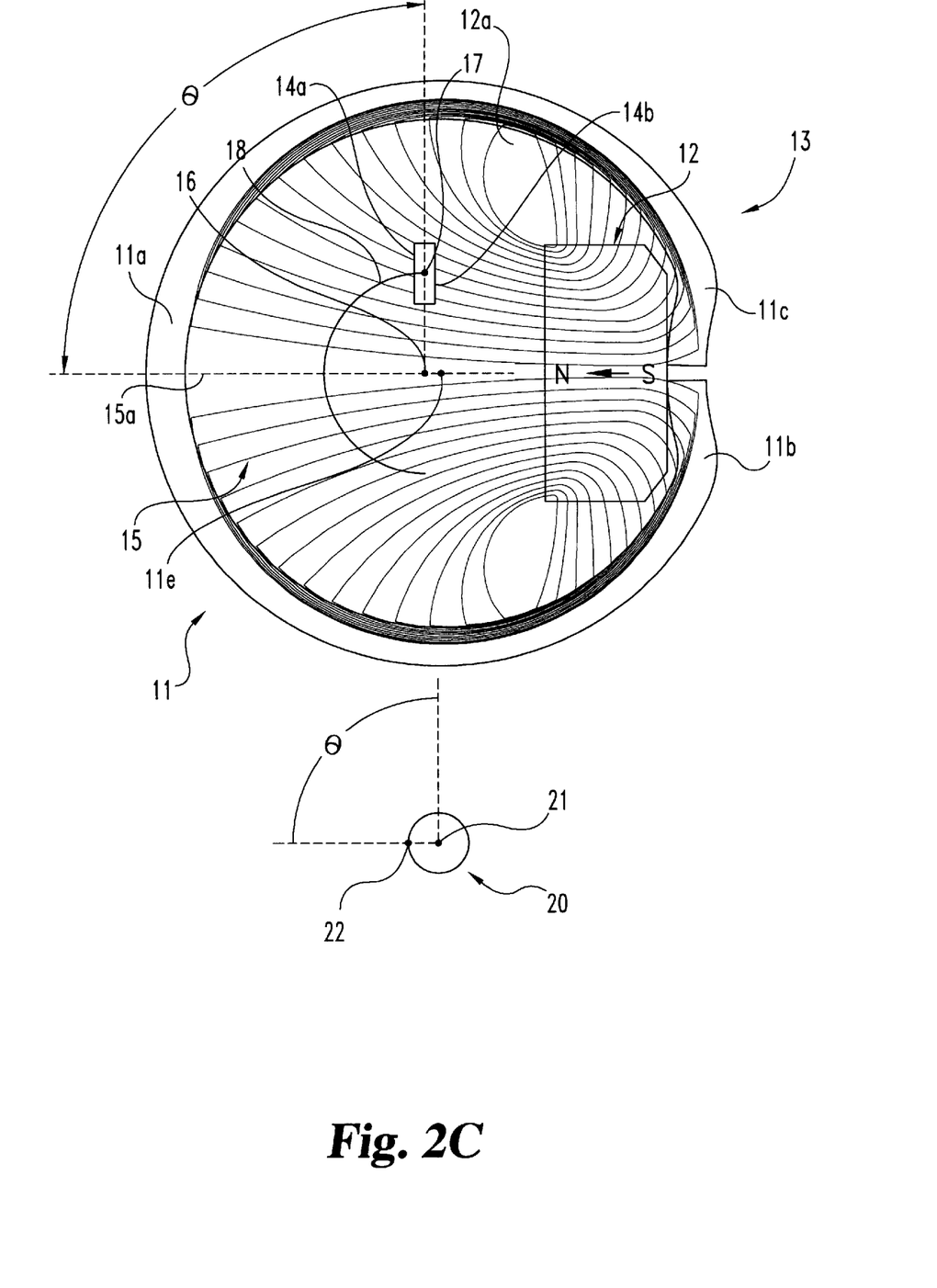
FIG. 2C is a third diagrammatic illustration of the magnetic circuit of FIGS. 1A–1D.

Ring pole piece 11 is adjoined to control shaft 20 to synchronously rotate magnetic field 15 about a second axis for each degree of rotation of control shaft 20 about a first axis, e.g. longitudinal axis 21 of control shaft 20, as further described in FIGS. 2A–2C and accompanying text. For the illustrated embodiment of the present invention, ring pole piece 11, magnet 12 and control shaft 20 are encapsulated in plastic to permanently affix south pole surface 12b to pole segment 11b and pole segment 11c, and to permanently affix ring pole piece 11 and control shaft 20 via a plastic base 23 as shown in FIGS. 1B and 1D.

Magnetic rotational position sensor 10 further comprises a magnetic flux sensor. For purposes of the present invention, a magnetic flux sensor is broadly defined as any device operable to sense a magnitude of a magnetic flux density passing through the device and operable to provide at least one voltage sensing signal representative of a magnitude of magnetic flux density passing through the device. For the illustrated embodiment of the present invention, the magnetic flux sensor is a Hall effect device 14, e.g. a HZ-302C(SIP type) Hall effect device manufactured by Ashai Kasei Electronics Co., Ltd., as shown in FIGS. 1A–1D. Hall effect device 14 has a first plane 14a and a second plane 14b, and is operable to sense a magnitude of magnetic flux density passing through plane 14a and plane 14b. Hall effect device includes an input lead 14c, a reference lead 14d, a first output lead 14e and a second output lead 14f. In response to a current drive signal $I_{DS}$ and a voltage drive signal $V_{DS}$, Hall effect device 14 is also operable to provide a first voltage sensing signal $V_{ss1}$ and a second voltage sensing signal $VSS_2$. Both voltage sensing signals $V_{ss1}$ and $VSS_2$ are representative of a magnitude of magnetic flux density passing through planes 14a and 14b, respectively, as further described in FIG. 3B, and accompanying text.

Referring to FIGS. 2A–2C, to sense each degree of rotation of control shaft 20 about an axis over a definable range of rotation, e.g. a 180 degree range of rotation about a longitudinal axis 21 of control shaft 20, a different magnitude of magnetic flux density must pass through planes 14a and 14b of magnetic flux sensor 14 for each degree of synchronized rotation of magnetic field 15 about a second axis, e.g. an axis 16, over the definable range of rotation. Consequently, an angular orientation angle θ of planes 14a and 14b relative to magnetic field 15 must change for each degree of synchronized rotation of magnetic field 15 about axis 16 over the definable range of rotation. Preferably, when magnetic flux sensor 14 is disposed along a center line 15a of magnetic field 15, planes 14a and 14b are parallel to magnetic field 15, i.e. an angular orientation angle θ of zero degrees, as shown in FIG. 2A. It is to be appreciated and understood that angular orientation angle θ relative to magnetic field 15 will change with each degree of synchronized rotation of magnetic field 15 about axis 16 over a +ninety (90) degree range of synchronized rotation of magnetic field 15 relative to magnetic flux sensor 14 as evidenced by the synchronized rotational movement of a center point 17 of magnetic flux sensor 14 and a reference point 22 of control shaft 20 as shown in FIGS. 2B and 2C. Thus, it is to be appreciated and understood that each degree of rotation of control shaft 20 about longitudinal axis 21 over a 180 degree range of rotation can be sensed because each degree of rotation of control shaft 20 about longitudinal axis 21 exclusively corresponds to a distinct degree of synchronized rotation of magnetic field 15 about axis 16 and a different magnitude of magnetic flux density will pass through magnetic flux sensor 14 for each degree of synchronized rotation of magnetic field 15 about axis 16 over the 180 degree range of rotation.

To linearly sense each degree of rotation of control shaft 20 about longitudinal axis 21 over the 180 degree range of rotation, angular orientation angle θ must uniformly change for each degree of synchronized rotation of magnetic field 15 about axis 16. One aspect of the present invention is that for a each axis of magnetic field 15 that intersects center line 15a, angular orientation angle θ uniformly changes along one radial arc originating from the selected axis for each degree of synchronized rotation of magnetic field 15 about the selected axis over approximately a +eighty (80) degree range of synchronized rotation of magnetic field 15. For example, angular orientation angle θ uniformly changes along a radial arc 18 originating from axis 16 for each degree of synchronized rotation of magnetic field 15 about axis 16 over approximately a +eighty (80) degree range of synchronized rotation of magnetic field 15 relative to magnetic flux sensor 14. Thus, it is preferred that magnetic flux sensor 14 is initially disposed within magnetic field 15 along center line 15a of magnetic field 15 with planes 14a and 14b parallel to magnetic field 15 and center point 17 of magnetic flux sensor 14 being an intersection point of center line 15a of magnetic field 15 and radial arc 18.

Referring still to FIGS. 2A–2C, several important points must be appreciated and understood. First, for the various embodiments of the present invention, the axis of control shaft 20 may or may not coincide with a selected axis of a provided and enclosed magnetic field. Preferably, the axis of control shaft 20 does coincide with the selected axis of the magnetic field, e.g. longitudinal axis 21 of shaft 20 coinciding with axis 16 of magnetic field 15. Second, for the various embodiments of the present invention, the axis of the magnetic field may or may not coincide with a central longitudinal axis of the ring pole piece. Preferably, the axis of the magnetic field does not coincide with the central longitudinal axis of the ring pole piece, e.g. axis 16 of magnetic field 15 not coinciding with longitudinal axis 11e of ring pole piece 11 as shown.

Third, the relative dimensions of a ring pole piece in accordance with the present invention and of a magnet in accordance with the present invention defines the maximum synchronous range of rotation of a provided and enclosed magnetic field relative to a magnetic flux sensor. For example, the relative dimensions of ring pole piece 11 and magnet 12 as illustrated enable magnetic field 15 to be rotated at least 180 degrees relative to magnetic flux sensor 14. Finally, the symmetrical configurations of a ring pole piece in accordance with the present invention and of a magnet in accordance with the present invention that is void of magnetic flux density "hot spots" along both pole surfaces relative to a center line of a provided and enclosed magnetic field equally balances the magnetic field throughout the air gap area. For example, the symmetrical configurations of ring pole piece 11 and magnet 12 relative to center line 15a of magnetic field 15 equally balances magnetic field 15 throughout air gap area 11d.

As previously described in FIGS. 1A–1D and accompanying text, a current drive signal $I_{DS}$ and a voltage drive signal $V_{DS}$ need to be supplied to Hall effect device 14 to provide voltage sensing signals $V_{SS1}$ and $V_{SS2}$. For the various embodiments of the present invention, any power source supplying current drive signal $I_{DS}$ and voltage drive signal $V_{DS}$ to Hall effect device 14 via input lead 14a may be exposed to adverse temperatures as low as −40° Celsius to as high as 150° Celsius when Hall effect device 14 is located in a engine compartment of a motor vehicle. As such, it is to be appreciated and understood that current drive signal $I_{DS}$ and voltage drive signal $V_{DS}$ can significantly fluctuate under such adverse temperature conditions. Accordingly, a preferred embodiment of a drive circuit 30 to invariably provide a constant current drive signal $I_{CDS}$ and a constant voltage drive signal $V_{CDS}$ over such adverse temperatures is shown in FIG. 3A.

Figure 3A:
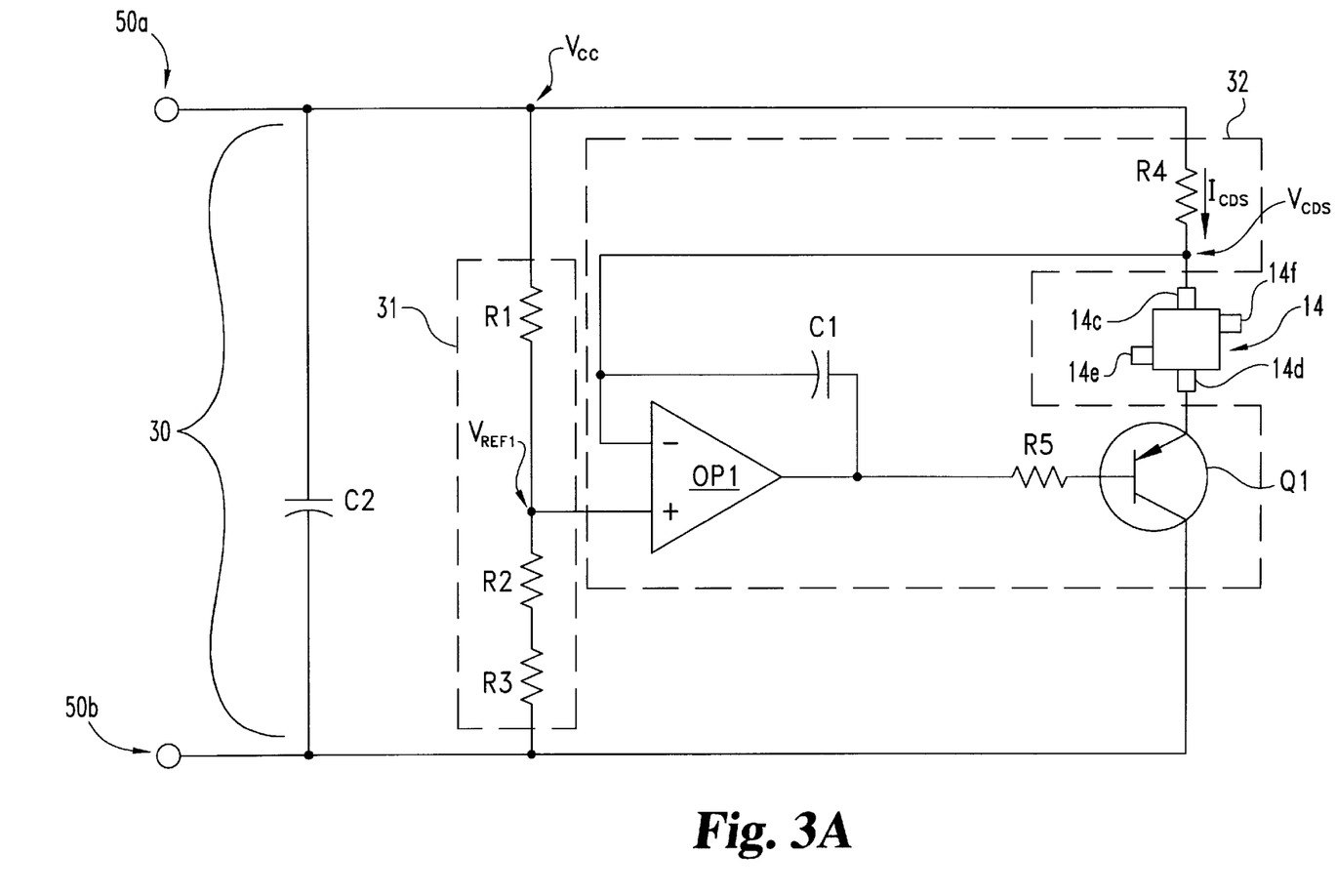
FIG. 3A is a schematic of a preferred embodiment of a drive circuit in accordance with the present invention.

Referring to FIG. 3A, drive circuit 30 comprises a voltage divider 31 operable to provide a reference voltage signal $V_{REF1}$ in response to a power signal $V_{CC}$. Voltage divider 31 includes a first resistor R1, a second resistor R2 and a third resistor R3 electrically coupled in series between a power supply terminal 50a and a ground reference terminal 50b of a power source (not shown) to thereby provide reference voltage signal $V_{REF1}$. Preferably, the power source transmits a power signal $V_{CC}$ of 5.0 volts between power supply terminal 50a and ground reference terminal 50b whereby reference voltage signal $V_{REF1}$ is approximately 2.5 volts. For the illustrated embodiment, it is preferred that resistors R1 and R2 are of equal value and that resistor R3 is of a significantly less value, e.g. resistors R1 and R2 can be 10 k ohm resistors, and resistor R3 can be a trimmable 1 k ohm resistor.

Drive circuit 30 further comprises a current amplifier 32 operable to provide and control constant current drive signal $I_{CDS}$ and constant voltage drive signal $V_{CDS}$ in response to power signal $V_{CC}$ and a reference voltage signal $V_{REF1}$. Current amplifier 32 includes a first operational amplifier OP1, a first bipolar pnp transistor Q1, a fourth resistor R4, a fifth resistor R5, and a first capacitor C1. Operational amplifier OP1 has a non-inverting input electrically coupled to voltage divider 31 to receive a reference voltage signal $V_{REF1}$, and an inverting input electrically coupled to input lead 14c of Hall effect device 14. Transistor Q1 has an emitter lead electrically coupled to reference lead 14d of Hall effect device 14 and a collector lead electrically coupled to ground reference terminal 50b. Resistor R4 electrically couples power supply terminal 50a to input lead 14c of Hall effect device 14. Resistor R5 electrically couples a power output of operational amplifier OP1 to a base lead of transistor Q1. Capacitor C1 electrically couples the power output of operational amplifier OP1 to the inverting input of operational amplifier OP1.

Figure 3B:
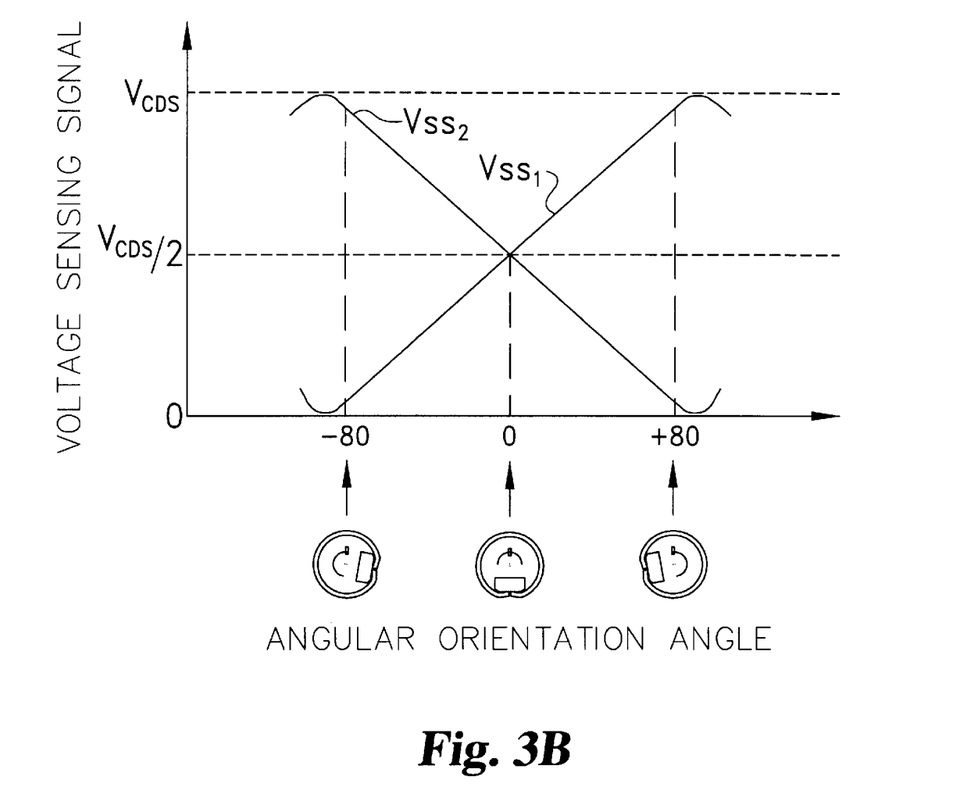
FIG. 3B is a graph depicting a waveform of a first provided voltage sensing signal and a waveform of a second provided voltage sensing signal of a preferred embodiment of the magnetic flux sensor of FIGS. 1A–1D.

Preferably, constant current drive signal $I_{CDS}$ is 7.0 milliamperes±10 microamperes and constant voltage drive signal $V_{CDS}$ is approximately 4.2 volts. Accordingly, it is preferred that resistor R4 is a 150 ohm resistor, resistor R5 is a 470 ohm resistor, and capacitor C1 is a 0.01 microfarads capacitor. Drive circuit 30 can further comprise an optional second capacitor C2 electrically coupling power supply terminal 50a and ground reference terminal 50b to eliminate any noise from power signal $V_{CC}$. Preferably, capacitor C2 is a 0.1 microfarads capacitor. Upon receipt of a constant current drive signal $I_{CDS}$ and a constant voltage drive signal $V_{CDS}$ via input lead 14c, Hall effect device 14 provides voltage sensing signals $V_{SS1}$ and $V_{SS2}$. Waveforms of provided voltage sensing signals $V_{SS1}$ and $V_{SS2}$ as related to angular orientation angle θ of Hall effect device 14 relative to magnetic field 15 are shown in FIG. 3B. Referring to FIGS. 2A–2C and 3B, it is to be appreciated and understood that each value of voltage sensing signals $V_{SS1}$ and $V_{SS2}$ along the waveforms exclusively corresponds to a distinct degree of rotation of control shaft 20 about a axis, e.g. longitudinal axis 21 of control shaft 20, over a 180 degree range of rotation. It is to be further appreciated and understood that voltage sensing signals $V_{SS1}$ and $V_{SS2}$ are linearly provided over approximately a middle 160 degrees of the 180 degree range of rotation. Unfortunately, voltage sensing signals $V_{SS1}$ and $V_{SS2}$ are high impedance loads that are typically not feasible as voltage output signals. Accordingly, a preferred embodiment of an output signal amplifier 40 is shown in FIG. 4.

Figure 4:
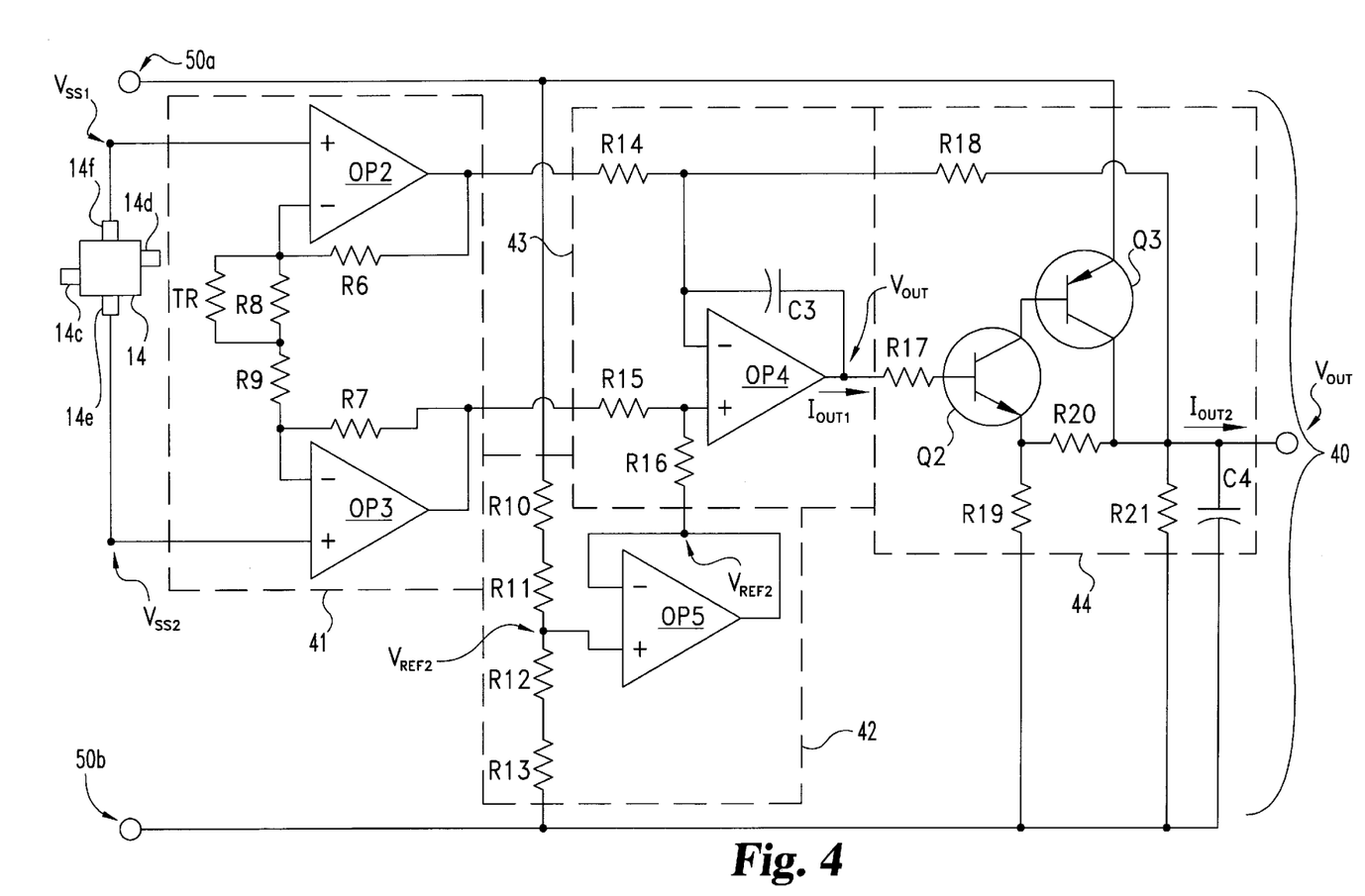
FIG. 4 is a schematic of a preferred embodiment of an output signal amplifier in accordance with the present invention.

Referring to FIG. 4, output signal amplifier 40 comprises a buffer amplifier 41 operable to buffer voltage sensing signals $V_{SS1}$ and $V_{SS2}$ and to counteract any temperature drift of voltage sensing signals $V_{SS1}$ and/or $V_{SS2}$ due to the ambient temperature of Hall effect device 14. Buffer amplifier 41 includes a second operational amplifier OP2, a third operational amplifier OP3, a sixth resistor R6, a seventh resistor R7, an eighth resistor R8, a ninth resistor R9, and a thermistor TR. Operational amplifier OP2 has a non-inverting input electrically coupled to output lead 14f of Hall effect device 14 to receive a provided voltage sensing signal $V_{SS1}$, and operational amplifier OP3 has a non-inverting input electrically coupled to output lead 14e of Hall effect device 14 to receive a provided voltage sensing signal $V_{SS2}$. Resistor R6 electrically couples a power output of operational amplifier OP2 to an inverting input of operational amplifier OP2. Resistor R7 electrically couples a power output of operational amplifier OP3 to an inverting input of operational amplifier OP3. Resistor R8 and resistor R9 in series electrically couple the inverting input of operational amplifier OP2 and the inverting input of operational amplifier OP3. Thermistor TR is electrically coupled in parallel to resistor R8. Preferably, resistors R6 and R7 are 10 k ohm resistors, and resistors R8 and R9 are 1 k ohm resistors.

Output signal amplifier 40 further comprises a voltage divider 42 operable to provide a reference voltage signal $V_{REF2}$ in response to a power signal $V_{CC}$. Reference voltage signal $V_{REF2}$ is provided to correct for any manufacturing anomalies of Hall effect device 14 as further described in FIG. 6A and accompanying text. Voltage divider 42 includes a tenth resistor R10, an eleventh resistor R11, a twelfth resistor R12, and a thirteenth resistor R13 electrically coupled in series to power supply terminal 50a and ground reference terminal 50b. Preferably, the power source transmits a power signal $V_{CC}$ of 5.0 volts between power supply terminal 50a and ground reference terminal 50b whereby reference voltage signal $V_{REF2}$ is approximately 2.5 volts. For the illustrated embodiment, it is preferred that resistors R10 and R13 are of equal value and that resistors R11 and R12 are of a significantly less value, e.g. resistors R10 and R13 can be 10 k ohm resistors, and resistors R11 and R12 can be trimmable 1 k ohm resistors. Voltage divider 42 further includes an operational amplifier OP5 having a non-inverting input electrically coupled to resistor R11 and resistor R12 to thereby receive reference voltage signal $V_{REF2}$, and an inverting input electrically coupled to a power output.

Output signal amplifier 40 further comprises a differential amplifier 43 operable to provide a voltage output signal $V_{OUT}$ and a first current output signal $I_{OUT1}$ in response to buffered voltage sensing signals $V_{SS1}$ and $V_{SS2}$, and a reference voltage signal $V_{REF2}$. Differential amplifier 43 includes an operational amplifier OP4, a fourteenth resistor R14, a fifteenth resistor R15, a sixteenth resistor R16, and a third capacitor C3. Resistor R14 electrically couples the power output of operational amplifier OP2 to an inverting input of operational amplifier OP4. Resistor R15 electrically couples the power output of operational amplifier OP3 to a non-inverting input of operational amplifier OP4. Resistor R16 electrically couples the power output of operational amplifier OP5 to the non-inverting input of operational amplifier OP4. Capacitor C3 electrically couples a power output of operational amplifier OP4 to the inverting input of operational amplifier OP4. It is to be appreciated that voltage output signal $V_{OUT}$ is representative of each degree of rotation of a control shaft 20 about the first axis. Preferably, voltage output signal $V_{OUT}$ ranges between 0 volts and 5.0 volts over the 180 degree range of rotation of control shaft 20, and linearly ranges between 0.5 volts and 4.5 volts over a middle 160 degrees of the 180 degree range of rotation. Accordingly, it is preferred that resistor R14, resistor R15 and resistor R16 are 10 k ohm resistors, and capacitor C3 is a 0.01 microfarads capacitor.

For various embodiments of the present invention, output signal amplifier 40 can further comprises a boost circuit 44 to transmit voltage output signal $V_{OUT}$ and to boost output current signal $I_{OUT1}$. Boost circuit 44 includes a first bipolar npn transistor Q2, a second bipolar pnp transistor Q3, a seventeenth resistor R17, an eighteenth resistor R18, a nineteenth resistor R19, a twentieth resistor R20, a twenty-first resistor R21, and a fourth capacitor C4. An emitter lead of transistor Q3 is electrically coupled to power supply terminal 50a. A base lead of transistor Q3 is electrically coupled to a collector lead of transistor Q2. Resistor R17 electrically couples the power output of operational amplifier OP4 to a base lead of transistor Q2. Resistor R18 electrically couples the inverting input of operational amplifier OP4 to a collector lead of transistor Q3. Resistor R19 electrically couples an emitter lead of transistor Q2 to ground reference terminal 50b. Resistor R20 electrically couples the emitter lead of transistor Q2 to the collector lead of transistor Q3. Resistor 21 and capacitor C4 electrically couple the collector lead of transistor Q3 to ground reference terminal 50b. Preferably, a boosted output current signal $I_{OUT2}$ is approximately five (5) milliamperes. Accordingly, it is preferred that resistor R17 and R19 are 5.6K ohm resistors, resistor R18 is a 10 k ohm resistor, R20 is a 8.2 k ohm resistor, R21 is a trimmable 1 k ohm resistor and capacitor C4 is a 0.1 mricrofarads capacitor.

Figure 5A:
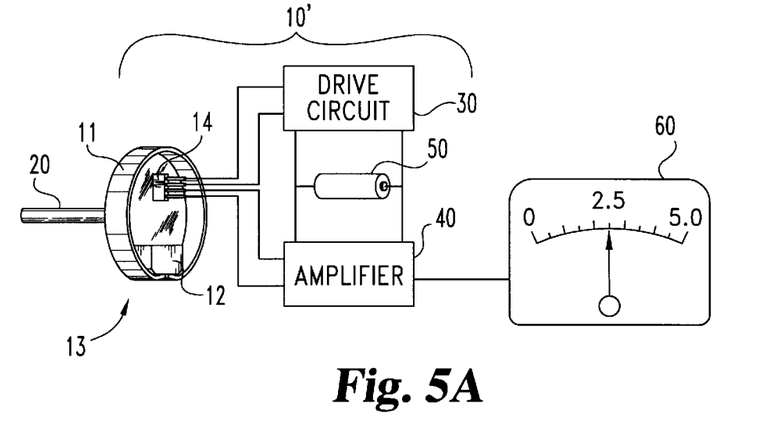
FIG. 5A is a diagrammatic illustration of a reference positioning of a magnetic flux sensor of a preferred embodiment of a magnetic rotational position sensor in accordance with the present invention as adjoined to a control shaft.
Figure 5B:
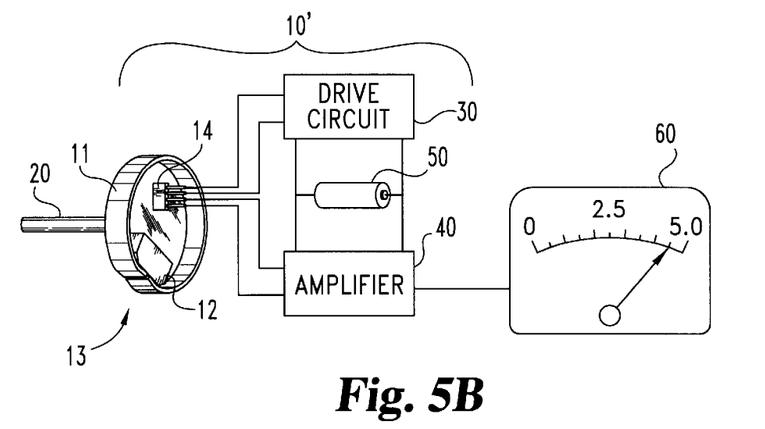
FIG. 5B is a diagrammatic illustration of a clockwise synchronous rotation of a magnetic circuit of the magnetic rotational position sensor of FIG. 5A.
Figure 5C:
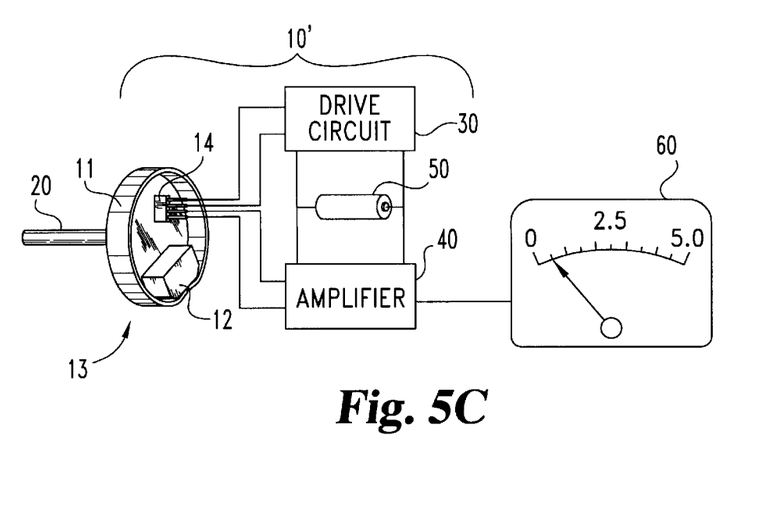
FIG. 5C is a diagrammatic illustration of a counterclockwise synchronous rotation of the magnetic circuit of the magnetic rotational position sensor of FIG. 5A.

Referring to FIGS. 5A–5C, a preferred embodiment of a magnetic rotational position sensor 10' in accordance with the present invention is shown. Magnetic rotational position sensor 10' comprises magnetic circuit 13, Hall effect device 14, drive circuit 30 and output signal amplifier 40 as previously described herein. Magnetic rotational position sensor 10' further comprises a power source 50, e.g. a battery as shown, electrically coupled to drive circuit 30 and output signal amplifier 40 to supply a power signal of 5.0 volts to drive circuit 30 and output signal amplifier 40. For the illustrated embodiment of the present invention, voltage sensing signals $V_{SS1}$ and $V_{SS2}$ should be 2.5 volts and output voltage signal $V_{OUT}$ should be 2.5 volts as indicated on a voltmeter 60 for an angular orientation angle θ of zero degrees as shown in FIG. 5A. It is to be appreciated and understood that Hall effect device 14 can have manufacturing anomalies that offsets voltage sensing signals $V_{SS1}$ and $V_{SS2}$ and output voltage signal $V_{OUT}$ from 2.5 volts. Thus, resistor R3 (FIG. 3A) of drive circuit 30, and resistor R11 and resistor R12 (FIG. 4) of output signal amplifier 40 are trimmed as necessary to transform the values of voltage sensing signals $V_{SS1}$ and $V_{SS2}$ and output voltage signal $V_{OUT}$ to 2.5 volts. It is to be further appreciated and understood that thermistor TR (FIG. 4) of output signal amplifier 40 will maintain the value of output voltage signal $V_{OUT}$ to 2.5 volts over a temperature range of approximately −40° Celsius and 150° Celsius. As a result, at an angular orientation angle θ of +eighty (80) degrees, voltage sensing signal $V_{SS1}$ is 4.5 volts, voltage sensing signal $V_{SS2}$ is 0.5 volts, and output voltage signal $V_{OUT}$ is 4.5 volts as indicated on voltmeter 60 as shown in FIG. 5B. Conversely, at an angular orientation angle θ of −eighty (80) degrees, voltage sensing signal $V_{SS1}$ is 0.5 volts, voltage sensing signal $V_{SS2}$ is 4.5 volts, and output voltage signal $V_{OUT}$ is 0.5 volts as indicated on voltmeter 60 as shown in FIG. 5C. It is to be appreciated and understood that output voltage signal $V_{OUT}$ varies linearly between 0.5 volts and 4.5 volts, and increases and decreases at a rate of 0.025 volts per full degree of rotation of control shaft 20. As a result, output voltage signal $V_{OUT}$ can be easily processed by a microprocessor based system to control all rotational movements of control shaft 20 about the first axis.

Figure 6A:
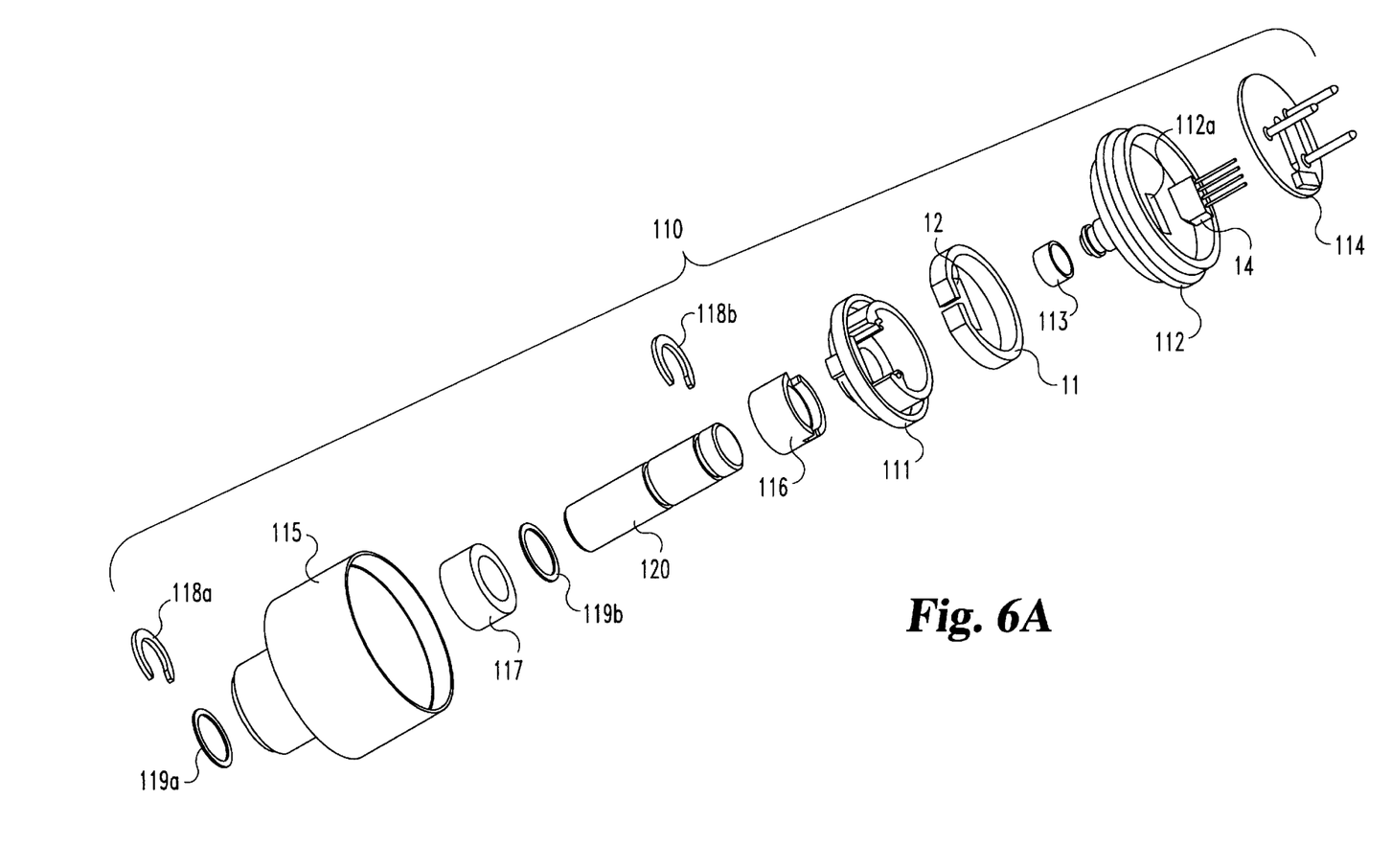
FIG. 6A is a first exploded view of a second embodiment of a magnetic rotational position sensor in accordance with the present invention.
Figure 6B:
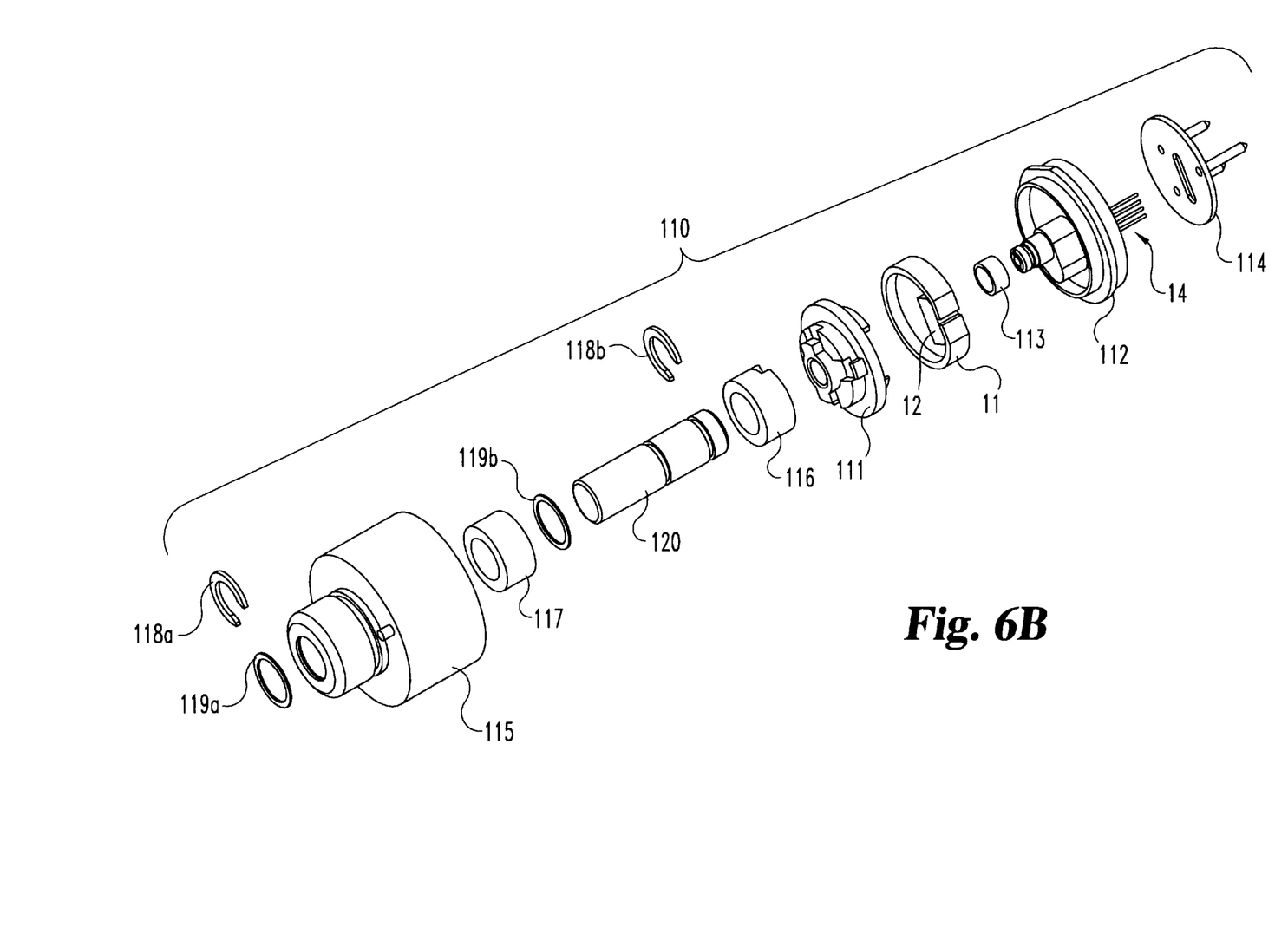
FIG. 6B is a second exploded view of a second embodiment of a magnetic rotational position sensor in accordance with the present invention.
Figure 6C:
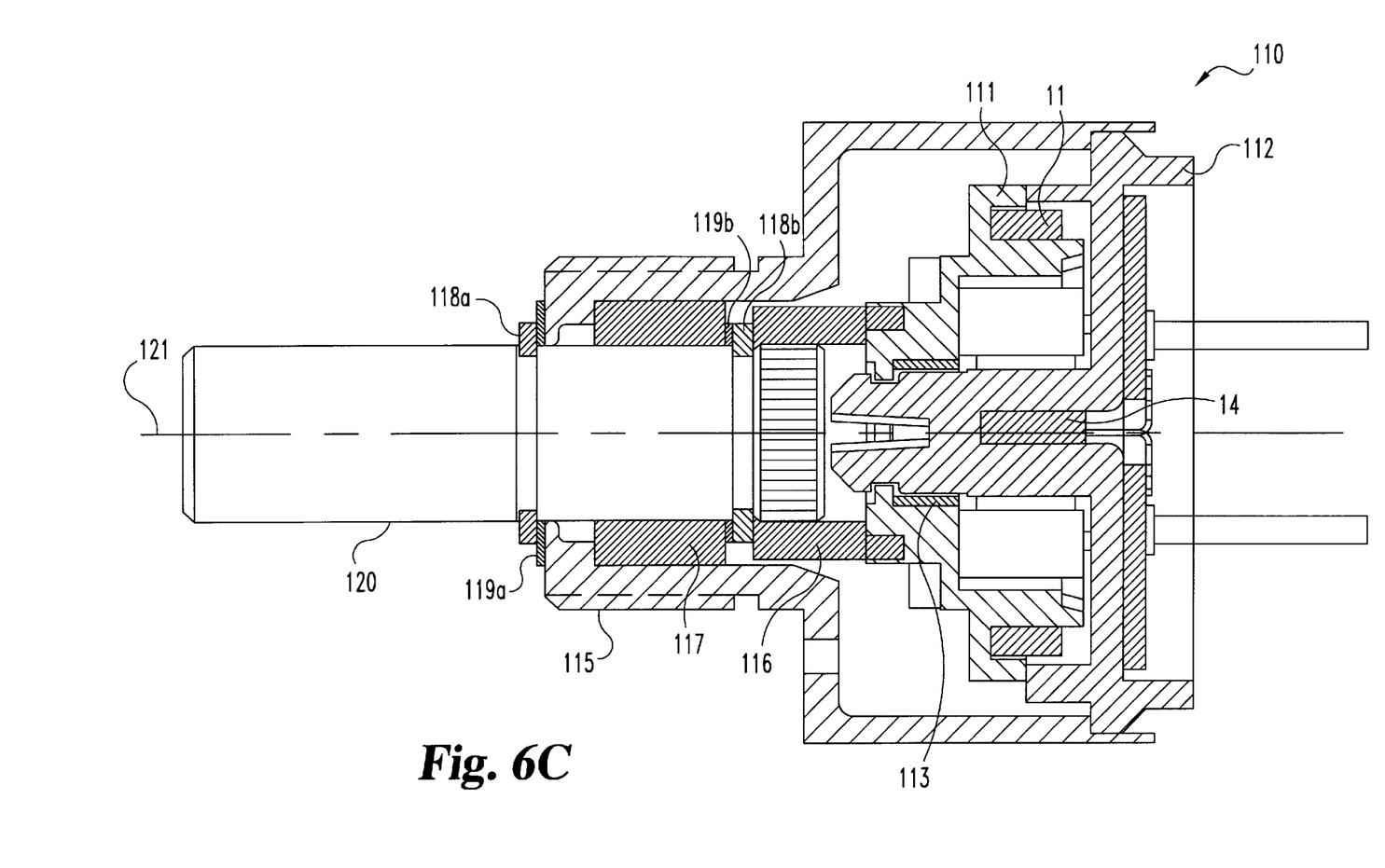
FIG. 6C is a longitudinal cross-sectional view of the magnetic rotational position sensor of FIG. 6A as assembled and adjoined to a control shaft.

Referring to FIGS. 6A–6C, a magnetic rotational position sensor 110 in accordance with the present invention is shown. Magnetic rotational position sensor 110 senses each degree of rotation of a control shaft 120 about a axis of control shaft 120 over a 180 degree range of rotation without experiencing magnetic hysteresis. Magnetic rotational position sensor 110 comprises ring pole piece 11, magnet 12, and magnetic flux sensor 14 as previously described herein. Magnetic rotational position sensor 110 further comprises a rotor 111 having a seat for ring pole piece 11 and a seat for magnet 12 as illustrated in FIGS. 2A–2C. A lid 112 is snap fitted within rotor 111 with a bearing cap 113 therebetween. Magnetic flux sensor 14 is extended through a slot 112*a* of lid 112 whereby magnetic flux sensor 14 is similarly disposed in air gap area 11*d* of ring pole piece 11 as illustrated in FIGS. 2A–2C. Magnetic flux sensor 14 is electrically coupled to PC board 114 which is adjoined to lid 112 whereby voltage sensing signal $V_{SS1}$ and voltage sensing signal $V_{SS2}$ (FIG. 3B) can be provided to output amplifier 40 (FIG. 4).

Lid 112 is adjoined to a housing 115 with rotor 111 being disposed within housing 115. Control shaft 120 extends through housing 115, and is detachably coupled to rotor 111 and housing 115 by a drive coupling 116, a bearing sleeve 117, a retainer ring 118*a*, a retainer ring 118*b*, a shim 119*a*, and a shim 119*b* as illustrated in FIG. 6C. Ring pole piece 11, magnet 12, rotor 111, and control shaft 120 synchronously rotate about a longitudinal axis 121 of control shaft 20 whereby voltage sensing signal $V_{SS1}$ and voltage sensing signal $V_{SS2}$ are representative of each rotational position of control shaft 120 about longitudinal axis 121.

All publications, patents, and patent applications cited in this specification are herein incorporated by reference as if each individual publication, patent, or patent application were specifically and individually indicated to be incorporated by reference and set forth in its entirety herein. While the present invention has been illustrated and described in detail in the drawings and foregoing description, the same is to be considered as illustrative and not restrictive in character, it being understood that the preferred embodiment has been shown and described and that all changes, equivalents, and modifications that come within the spirit of the invention are desired to be protected.

What is claimed is:

1. A magnetic rotational position sensor for sensing each degree of rotation of a control shaft about a first axis over a definable range of rotation, said magnetic rotational position sensor comprising:
    a ring pole piece defining an air gap area, said ring pole piece including
        a first pole segment,
        a second pole segment adjoined to said first pole segment, and
        a third pole segment adjoined to said first pole segment and spaced from said second pole segment;
    a magnet disposed in said air gap area to generate a magnetic field within said air gap area, said magnet including
        a first pole surface facing said first pole segment, and
        a second pole surface facing said second pole segment and said third pole segment,
            wherein said ring pole piece and said magnet are adjoined to the control shaft to synchronously rotate said magnetic field about a second axis for each degree of rotation of the control shaft about the first axis whereby each degree of rotation of the control shaft about the first axis exclusively corresponds to a distinct degree of synchronized rotation of said magnetic field about said second axis; and
    a magnetic flux sensor operable to sense a magnitude of magnetic flux density passing through said first magnetic flux sensor, said magnetic flux sensor disposed within said magnetic field to sense a different magnitude of magnetic flux density passing through said first magnetic flux sensor for each degree of synchronous rotation of said magnetic field over the definable range of rotation.

2. The magnetic rotational position sensor of claim 1 wherein said second pole surface is adjoined to said second pole segment.

3. The magnetic rotational position sensor of claim 1 wherein said second pole surface is adjoined to said second pole segment and said third pole segment.

4. The magnetic rotational position sensor of claim 1 further comprising:
    a drive circuit including means for generating a constant current drive signal and a constant voltage drive signal,
        wherein said magnetic flux sensor is operatively coupled to said circuit to thereby provide a first voltage sensing signal and a second voltage sensing signal in response to said constant current drive signal and said constant voltage drive signal, said first voltage sensing signal being representative of a sensing of a magnitude of magnetic flux density passing through a first surface of said magnetic flux sensor, said second voltage sensing signal being representative of a sensing of a magnitude of magnetic flux density passing through a second surface of said magnetic flux sensor.

5. The magnetic rotational position sensor of claim 4 further comprising:
    an output signal amplifier operatively coupled to said magnetic flux sensor to thereby receive said first voltage sensing signal and said second voltage sensing signal, said output signal amplifier operable to provide a voltage output signal in response to said first voltage sensing signal and said second voltage sensing signal, said voltage output signal representative of each degree of rotation of the control shaft about the first axis over the definable range of rotation,
        wherein said output signal amplifier include means for counteracting any temperature drift of first voltage sensing signal and any temperature drift of said second voltage sensing signal.

6. The magnetic rotational position sensor of claim 1 wherein the first axis and said second axis coincide.

7. The magnetic rotational position sensor of claim 1 wherein said rotor is detachably coupled to the control shaft by a drive coupling.

8. A magnetic rotational position sensor for sensing each degree of rotation of a control shaft about a first axis over a definable range of rotation, said magnetic rotational position sensor comprising:
    a ring pole piece extending about a periphery and defining an inner air gap area said ring pole piece being interrupted along said periphery to define a peripheral air gap spacing;
    a magnet disposed in said inner air gap area said magnet including a first pole surface facing said peripheral air gap spacing and a second pole surface facing away from said peripheral air gap spacing, said magnet cooperating with said ring pole piece to generate a magnetic field within said inner air gap area;
    a rotor adjoined to the control shaft, said ring pole piece and said magnet being adjoined to said rotor to synchronously rotate said magnetic field about a second axis for each degree of rotation of the control shaft about the first axis whereby each degree of rotation of the control shaft about the first axis exclusively corresponds to a distinct degree of synchronized rotation of said magnetic field about said second axis;

a lid rotatably adjoined to said rotor to cover said ring pole piece and said magnet; and a magnetic flux sensor operable to sense a magnitude of magnetic flux density passing therethrough, said magnetic flux sensor being disposed within said magnetic field to sense a different magnitude of magnetic flux density passing therethrough for each degree of synchronous rotation of said magnetic field over the definable range of rotation.

9. The magnetic rotational position sensor of claim 8 wherein said lid includes a slot, said magnetic flux sensor extending through said slot into said air gap area.

10. The magnetic rotational position sensor of claim 9 further comprising:

a PC board adjoined to said lid, said magnetic flux sensor being electrically coupled to said PC board.

11. The magnetic rotational position sensor of claim 10 further comprising a housing detachably coupled to the control shaft, said rotor being disposed within said housing with said lid being adjoined to said housing to enclose said rotor.

12. The magnetic rotational position sensor of claim 1 further comprising:

a rotor including a means for seating said ring pole piece and said magnet whereby said magnetic field synchronously rotates about said second axis for each degree of rotation of the control shaft about the first axis.

13. The magnetic rotational position sensor of claim 12 further comprising:

a lid including a means for positioning said magnetic flux sensor within said air gap area.

14. The magnetic rotational position sensor of claim 12 further comprising:

a means for detachably coupling said rotor to the control shaft.

15. The magnetic rotational position sensor of claim 12 further comprising:

a housing, said rotor disposed within said housing.

16. The magnetic rotational position sensor of claim 15 further comprising:

a means for detachably coupling said housing to the control shaft.

17. The magnetic rotational position sensor of claim 1 wherein said first pole segment has an arcuate configuration, said second and third pole segments having a rectangular configuration.

18. The magnetic rotational position sensor of claim 1 wherein said ring pole piece and said magnet are symmetrical relative to a centerline to balance said magnetic field, said centerline passing through said spacing between said second and third pole segments.

19. A magnetic rotational position sensor for sensing each degree of rotation of a control shaft about a first axis over a definable range of rotation, said magnetic rotational position sensor comprising:

a ring pole piece extending about a periphery and defining an inner air gap area, said ring pole piece being interrupted along said periphery to define a peripheral air gap spacing;

a magnet disposed in said inner air gap area, said magnet including a first pole surface facing said peripheral air gap spacing and a second pole surface facing away from said peripheral air gap spacing, said ring pole piece and said magnet cooperating to generate a magnetic field within said inner air gap area;

said ring pole piece and said magnet being adjoined to the control shaft to synchronously rotate said magnetic field about a second axis for each degree of rotation of the control shaft about the first axis whereby each degree of rotation of the control shaft about the first axis exclusively corresponds to a distinct degree of synchronized rotation of said magnetic field about said second axis; and a magnetic flux sensor operable to sense a magnitude of magnetic flux density passing therethrough, said magnetic flux sensor being disposed within said magnetic field to sense a different magnitude of magnetic flux density passing therethrough for each degree of synchronous rotation of said magnetic field over the definable range of rotation.

20. The magnetic rotational position sensor of claim 19 wherein said ring pole piece and said magnet are symmetrical relative to a centerline to balance said magnetic field, said centerline passing through said peripheral air gap spacing.

* * * * *

UNITED STATES PATENT AND TRADEMARK OFFICE
CERTIFICATE OF CORRECTION

PATENT NO.     : 6,417,664 B1
DATED          : July 9, 2002
INVENTOR(S)    : David Anthony Ventroni et al.

It is certified that error appears in the above-identified patent and that said Letters Patent is hereby corrected as shown below:

<u>Column 10,</u>
Line 51, please change "claim 1" to -- claim 8 --.
Line 59, please insert -- , -- between "area" and "said".
Line 62, please insert -- , -- between "area" and "said".

Signed and Sealed this

Twenty-fourth Day of December, 2002

JAMES E. ROGAN
*Director of the United States Patent and Trademark Office*